No. 712,931. Patented Nov. 4, 1902.
G. T. HUDGENS.
DOG ATTACHMENT FOR LOGGING CARS, &c.
(Application filed July 23, 1902.)
(No Model.)
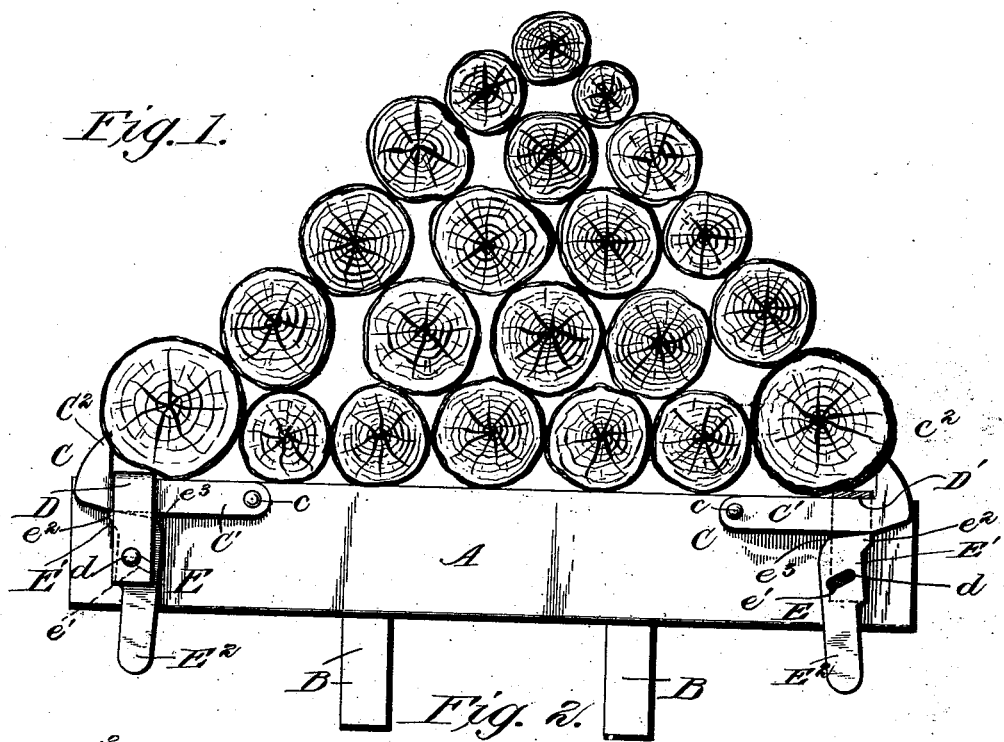
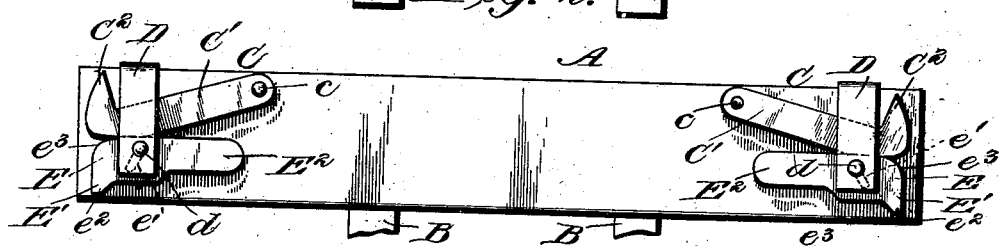
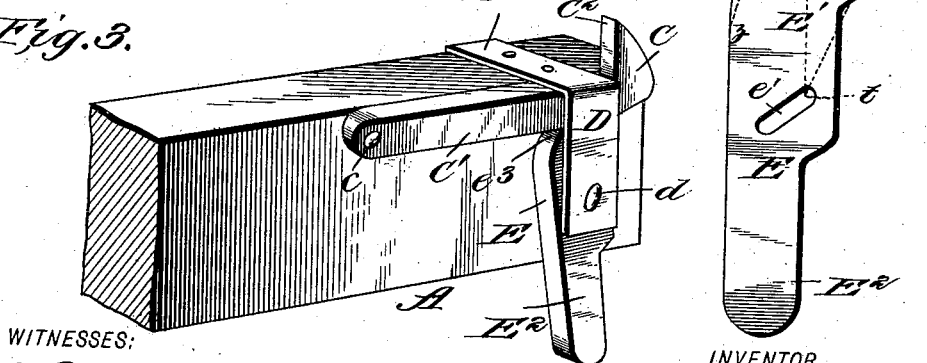
WITNESSES:
Fred. Bradford
Geo. S. Brock
INVENTOR
George T. Hudgens
BY Munn & Co.
ATTORNEYS.

United States Patent Office.

GEORGE THOMAS HUDGENS, OF NEW WAVERLY, TEXAS.

DOG ATTACHMENT FOR LOGGING-CARS, &c.

SPECIFICATION forming part of Letters Patent No. 712,931, dated November 4, 1902.

Application filed July 23, 1902. Serial No. 116,740. (No model.)

*To all whom it may concern:*

Be it known that I, GEORGE THOMAS HUDGENS, of New Waverly, in the county of Walker and State of Texas, have invented a new and useful Improvement in Dog Attachments for Logging-Cars, &c., of which the following is a specification.

My invention relates to an improvement in dog attachments for logging cars, sleds, wagons, &c., and has for its object to provide a device which will securely retain logs on a car, sled, or wagon and also readily release the same for unloading when required.

My invention consists of the novel construction, arrangement, and combination of parts, as will be hereinafter fully described, and pointed out in the claims.

In the drawings, Figure 1 is a front elevation of a portion of a logging-car, showing my device in operative position. Fig. 2 is a similar view showing the dogs down and out of operative position. Fig. 3 is a perspective view. Fig. 4 is a detail elevation of the latch.

A represents the bunk of a logging car, wagon, sled, or other log-carrier as forming a portion of a car-truck and as secured to the reach beams or timbers B B. Near each end of the bunk A is pivoted an angled dog or spike C at its inner end to the face of the bunk by a bolt $c$. Each dog consists of the base or horizontal member $C'$ and the vertical member $C^2$, the inner face of which is at substantially a right angle to the upper face of the horizontal member, and the outer face of said vertical member is curved, forming a sharp point or edge with the said inner face. The lower face of the horizontal member extends parallel with the upper face thereof to within a short distance of its outer end, at which point it is beveled upwardly and meets the curved outer face of the vertical member of the dog or spike. Said dog or spike is limited in its upward movement by an angle-bracket D, the horizontal member $D'$ of which is secured to the upper face of the bunk and extending outwardly a sufficient distance to just clear the pivoted dog or spike is turned downwardly at a right angle and extends a suitable distance in that direction, being secured at its lower end to the face of the bunk A by a bolt $d$, which passes through the diagonal slot in the latch E, presently described, through the bunk A and is held by a nut on its opposite end.

The latch E consists of the head portion $E'$ and the heel portion $E^2$, and the head portion is provided with the diagonal slot $e'$, the nose or lug $e^2$, and the rounded rear upper corner $e^3$, as shown. The heel portion $E^2$ of the latch is simply a reduced extension of the head portion, the purpose of which will be presently described. The curved line from $x$ to $y$ of the latch E is somewhat fuller than from $x$ to $z$ in order that the latch at this point will tighten under the dog when thrown to its locked position. The point of the vertical member of the dog being sharp and quite long cuts through the bark of the log resting thereon into the trunk of the same, and thereby securely holds the same in place.

It has been heretofore the practice to use stationary spikes or dogs; but with this method it is apparent that comparatively short spikes have to be used and of course have very slight holding power, and frequent accidents have arisen from the use of such stationary spikes or dogs. Another mode has been to use removable spikes; but with these there is great danger to the person removing the spikes and also liability of loss by falling out and into the water when the loading and unloading are done at such a place. By the use of my device no such occurrences can take place, as the parts, being permanently secured to the bunk, cannot be lost. The position and angle of the slot are secured by a suitable geometrical diagram and calculation, as are also the amount of curvature from $z$ to $x$ and from $x$ to $y$ and the distance from $t$ to $u$ and $v$ and the necessary correlation of these various elements.

To secure the logs on the car, the point of the dog is moved upwardly and the latch swung under the same, when by virtue of the diagonal slot in said latch the head of said latch will move beyond its vertical center and remain in such position, no matter how great the weight or pressure on the dog may be, the curve from $x$ to $y$ binding tightly on the lower surface of the dog, and the distance from $t$ to $v$ being greater than from $t$ to $u$ it will be impossible for the point $v$ to move backwardly free of the base of the dog. The heel of the latch E when the dog is in its operative position projects downwardly and slightly obliquely toward the outside of the car.

The operation is as follows: The dog is carried to its uppermost position, as stated, and the latch swung under the same, securely holding the dog in place. The logs are now placed on the car and surrounded by the usual binder, the sharp edge of the dog being forced in the bark and into the trunk of the log resting against it. Now when it is desired to unload the logs the binder having been removed the operator strikes the outer lower face of the latch, whereupon the pivoted dog will drop and rest upon the latch, which is now in a substantially horizontal position, and permit the logs to roll over the side of the car. The office of the slot in the latch is to cause the latch to retain its position either up or down—when up by throwing it beyond its vertical center and when down by balancing the same. The retaining-bracket serves to limit the upward swing of the pivoted dog, and thus prevent its being accidentally thrown over out of operative position.

Having thus described my invention, what I claim as new, and desire to secure by Letters Patent, is—

1. The combination with the bed of a vehicle, of an angled dog comprising a pointed vertical member, and a horizontal extension pivoted to said bed, and a latch pivoted adjacent to said dog and adapted to engage and lock the said angled dog in its operative position.

2. The combination with the bed of a vehicle, of a pivoted horizontal dog provided with a pointed vertical extension, and a latch having an elongated slot therein and a pin passing through said slot, said latch being pivoted below said dog and adapted to be swung into engagement with and lock the dog in its operative position.

3. The combination with the bed of a vehicle, of a pivoted dog comprising a horizontal and a vertical member, a vertically-swinging latch pivoted below said dog and provided with an oblique slot, a pin passing through said slot, whereby the latch is adapted to be swung into engagement with the lower face of the dog and lock the same in its operative position.

4. The combination with the bed of a vehicle, of a pivoted horizontal dog provided with a vertical pointed end member, a retaining-bracket extending over and alongside said dog, a latch pivoted between said bracket and bed below said dog, said latch being provided with a head portion adapted to engage the lower face of the dog and lock the same in its operative position.

5. The combination with the bed of a vehicle, of a pivoted dog comprising a horizontal member and a vertical pointed member, a retaining-bracket secured to said bed, extending over and downwardly alongside said dog, a vertically-swinging latch pivoted to the bed below the said dog, said latch provided with an oblique slot for the passage of its pivot-pin, and having its rear upper corner rounded, whereby when the lower portion of the latch is moved outwardly the head of said latch will be moved beyond its vertical center, and the upper edge thereof moved into contact with the lower face of the pivoted dog and lock the same in its operative position.

6. The combination with the bed of a vehicle, of a horizontal dog pivoted thereto and provided with a pointed vertical end member, a vertically-swinging latch pivoted below said dog adapted to be swung into engagement with the lower face of the dog and lock the same in its operative position, and a retaining-bracket secured to the said bed and extending over the said dog, whereby the upward movement of the pivoted dog is limited.

GEORGE THOMAS HUDGENS.

Witnesses:
D. J. WOMBLE,
C. D. OLEPHINT.